…

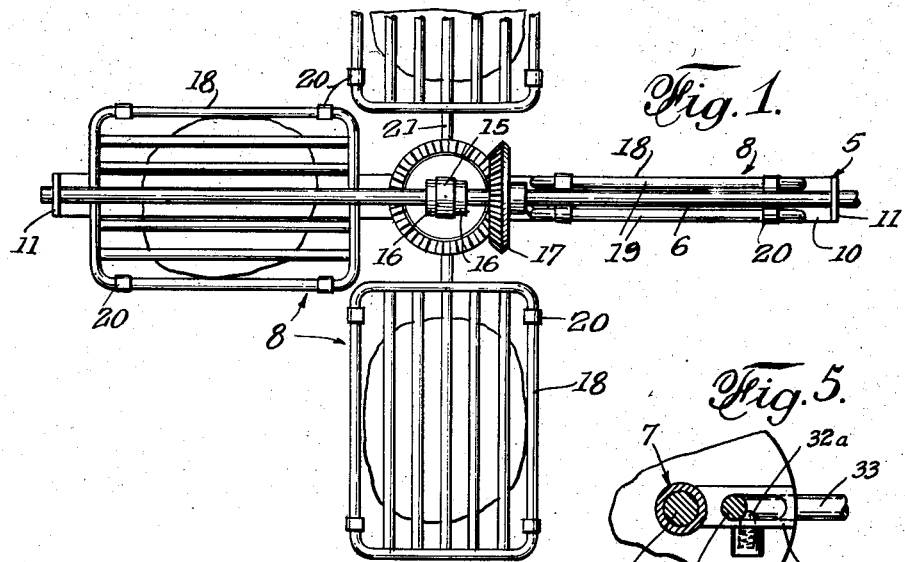
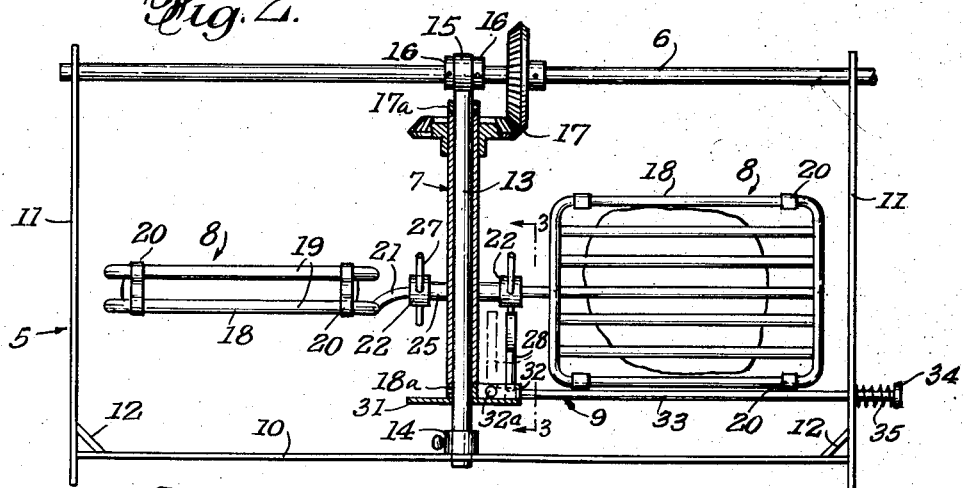
INVENTOR.
ARTHUR J. KOSER
BY C. G. Stratton
ATTORNEY

United States Patent Office 2,883,924
Patented Apr. 28, 1959

2,883,924

ROTARY BARBECUE GRILL

Arthur J. Koser, Bakersfield, Calif.

Application October 22, 1956, Serial No. 617,320

1 Claim. (Cl. 99—427)

This invention relates to a rotary barbecue grill and it is an object of the invention to provide a grill structure that not only continuously moves the material being cooked over the surface of a fire, but also turns the same to alternately present the two sides to the fire while being moved.

Another object of the invention is to provide a grill of the character referred to that, by presenting all sides of the food to the fire, provides for even cooking and minimizes handling of the food to reduce crumbling or separation thereof. Also, since the operation is automatic, the need for constant attention is obviated. Further, charring and flare-ups are eliminated because of the constantly moving food in the present grill.

A further object of the invention is to provide a multi-griddle cooking device in which the griddles may be removed or added, as desired, to vary the cooking time of food carried thereby and also vary the capacity of the device without affecting the operation thereof.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a broken top plan view of a rotary barbecue grill according to the present invention.

Fig. 2 is a side elevational view thereof, partly in vertical section.

Fig. 3 is an enlarged vertical sectional view as taken on the line 3—3 of Fig. 2.

Fig. 4 is a similarly enlarged fragmentary sectional view of portions shown in Fig. 3.

Fig. 5 is a broken plan sectional view taken on the line 5—5 of Fig. 3, showing the device in non-operating condition.

The present device is adapted to be embodied as an integral part of conventional barbecue equipment or the same may be provided as an independent unit adapted for separable connection with a barbecue. In any case, the same is adapted for use in operative association with a food-cooking fire and positioned above such fire.

The rotary barbecue grill that is illustrated comprises, generally, a frame 5 provided with a rotating spit shaft 6, a preferably vertical rotary sleeve 7 mounted in said frame and driven by the spit shaft 6, a plurality of griddles, grids, gridirons, or the like 8, removably carried by said sleeve 7 and rotatable therewith, and means 9 having successive engagement with said griddles to turn the same so that the opposite sides thereof are presented to the cooking fire beneath the frame 5.

The frame 5 is shown as may be provided for an independent grill unit. Said frame comprises a horizontal member 10 provided at its ends with vertical members 11, braces or gussets 12 being provided where the members 10 and 11 are joined to render the frame rigid. Flat bar stock may advantageously be used for the members 10 and 11.

The spit shaft 6 is mounted to extend above and parallel to member 10, said shaft having bearing in the upper ends of the members 11. A conventional motor (not shown) may be connected to shaft 6 to drive the same or, by providing a hand crank instead of such motor, manual rotation of shaft 6 may be effected.

The frame 5 further includes a central vertical standard 13 that is fixedly connected at 14 to the frame member 10, at its lower end, and is provided, at its upper end, with a bearing ring 15 through which shaft 6 extends and which serves to support said shaft intermediate its ends. Endwise movement of the spit shaft is obviated by providing the same with collars 16, one on each side of the bearing ring 15.

The sleeve 7 is disposed on standard 13 and located against endwise movement between collars 17a and 18a affixed to said standard. The driving connection between shaft 6 and sleeve 7 is shown as bevel gearing 17 although the same may take any conventional form and even may include speed-changing means if shaft 6 is of constant speed, so that the speed of rotation of the sleeve 7 may be varied, as desired, relative to the speed of rotation of the shaft 6.

The griddles 8 are all alike and their food-engaging portions 18 may vary, the same being here shown as two gridirons 19 that are separably connected by spring clips 20. Regardless how otherwise constructed, each griddle 8 is provided with a stud 21 on which is affixed a collar 22 that is provided with spring clips 23. Each collar is applied to each respective stud 21 so that an end 24 of said stud extends beyond the collar, as clearly shown in Fig. 4.

The sleeve 7 is provided with one or more laterally-extending sockets 25. Four such sockets are shown and the mentioned ends 24 of the griddle studs 21 are adapted to be rotationally entered into said sockets and removably held in place by engagement of clips 23 with end flanges 26 provided on said sockets. Thus, a full complement of griddles may be mounted on tube 7 to be moved in a circular path around the axis of said tube or, as desired, one or more of said griddles may be removed and/or replaced.

The means 9 comprises a plurality of preferably radial jogging pins 27 on each griddle collar, a member 28 preferably having two spaced arms 29 and 30 in the path of pins 27, a plate 31 affixed to collar 18 and, therefore, affixed to the standard 13, a slide 32 carried by said plate 31 and in which the member 28 is guided, a horizontal rod 33 connected to member 28 and extending through an aperture in one of the frame members 11, a head 34 on the end of said rod 33 beyond member 11, and a spring 35 between said member and head to bias the rod 33 in a direction to move the member 28 into the path of movement of pins 27. The slide 32 may be provided with a latch or shoulder to hold member 28 retracted to the dot-dash line position of Fig. 2, thereby rendering the turning function of the device inoperative. Such a latch is shown at 32a in Fig. 5. A pull on head 34 causes retraction of said latch and movement of the member 28 to operating position, the spring 35 maintaining this position until a non-operating condition of the turning function is desired, at which time the head 34 is pushed to move the member 28 past the latch 32a.

As will be seen from Fig. 3, as a griddle moves past the member 28, the arm 29 thereof will engage a pin 27 and cause partial rotation of stud 22 and the griddle 8 extending therefrom. As the movement of the griddle continues, the pin 27a that had been moved into the space between arms 29 and 30 is engaged by the latter arm, to further partly turn or rotate said stud 22. The parts may be so proportioned as to provide a full 180° rotation of stud 22, thereby turning the griddle so that the same is completely reversed.

From the foregoing, it will be seen that, after one circular movement of a griddle around the axis of sleeve 7, the griddles 8 are successively turned to prevent their opposite sides to the fire therebeneath. At the end of the next such circular movement, the griddles are again turned.

The plate 31 acts to deflect heat toward the griddles and also to minimize heat reaching the parts thereabove.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claim.

Having thus described my invention, what I claim and desire to secure by Letters Patent is:

In a barbecue, a fixed vertical standard, a support plate affixed to the standard, a rotational sleeve around the standard and supported by said plate, a plurality of griddles extending radially from the sleeve and each provided with an axial stud on which the respective griddles are rotational relative to the sleeve around the respective axes of the studs, each stud being provided with a set of radial pins and a member having fixed arms in the paths of the radial pins during movement of the griddles with the sleeve around the standard, said arms engaging said pins to turn the griddles top for bottom, means mounting said arms for adjustment out of the path of movement of the pins, and means to lock the adjusment.

References Cited in the file of this patent

UNITED STATES PATENTS

| | | |
|---|---|---|
| 1,731,743 | Harrison | Oct. 15, 1929 |
| 2,324,233 | Parsons | July 13, 1943 |
| 2,813,505 | Eirinberg | Nov. 19, 1957 |